Nov. 7, 1961 — W. E. KNOPF — 3,007,661
FISHING ROD HOLDER
Filed Dec. 22, 1958
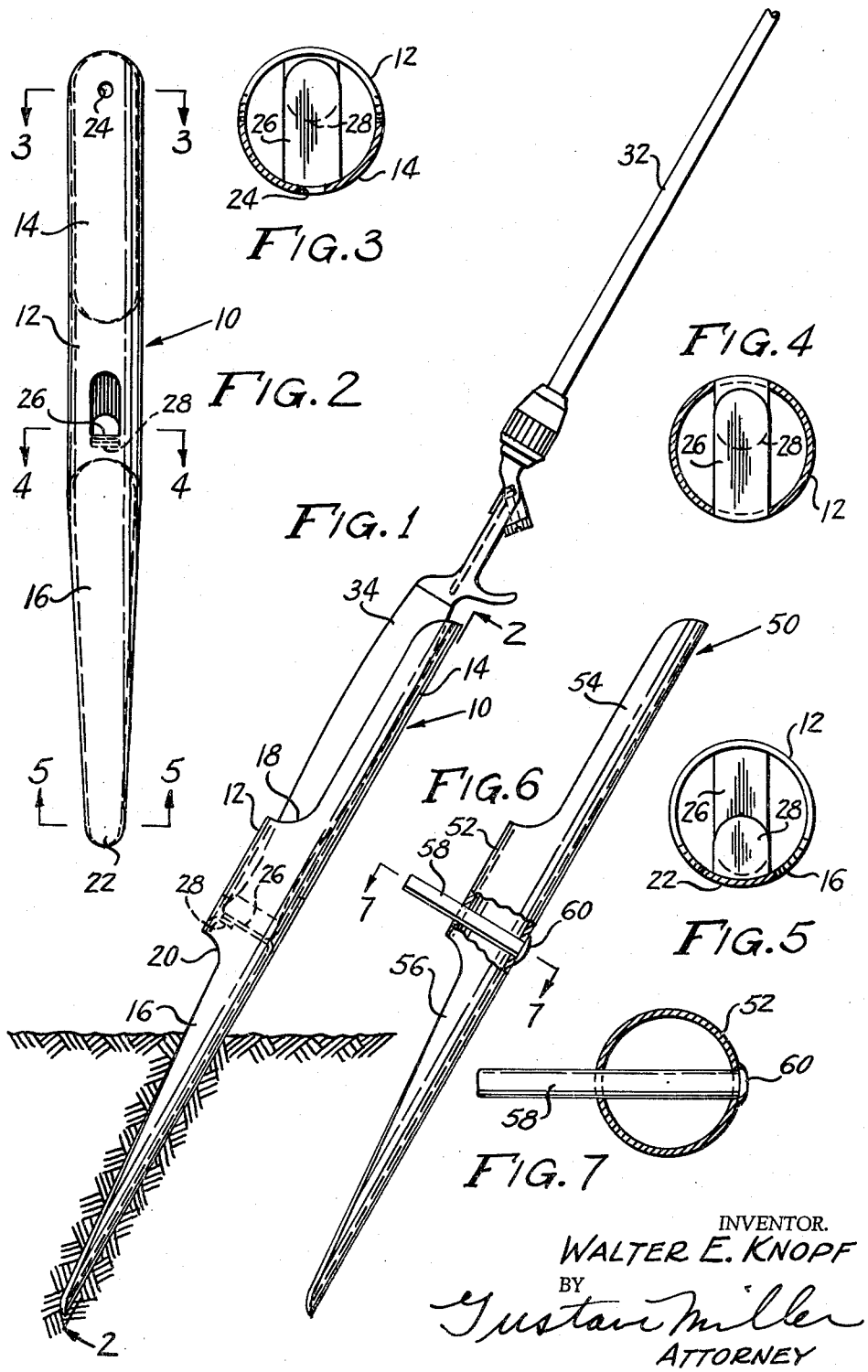
INVENTOR.
WALTER E. KNOPF
BY Gustav Miller
ATTORNEY United States Patent Office 3,007,661
Patented Nov. 7, 1961

3,007,661
FISHING ROD HOLDER
Walter E. Knopf, 9400 SE. 41st Ave., Portland 22, Oreg.
Filed Dec. 22, 1958, Ser. No. 782,284
2 Claims. (Cl. 248—44)

This invention relates to a supporting device for fishing rods, and it particularly relates to a supporting device of this type which is adapted to be inserted in the ground.

There have heretofore been produced various types of ground-supported fishing rod holders adapted to be stuck into the ground where desired; however, all such prior types of holders were either so complex in construction that they were difficult to use and overly expensive to manufacture, or were not adequately well constructed to serve their function effectively.

It is one object of the present invention to overcome the above and other difficulties inherent in prior fishing rod holders by providing a holder which is extremely simple in construction and yet very effective as a support means.

Another object of the present invention is to provide a fishing rod holder which will permit insertion and removal of the fishing rod with a minimum of manipulation.

Other objects of the present invention are to provide an improved fishing rod holder, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

FIG. 1 is a side elevational view of a fishing rod holder embodying the present invention, the holder being shown with a fishing rod in place therein;

FIG. 2 is an elevational view taken on line 2—2 of FIG. 1;

FIG. 3 is a cross-sectional view taken on line 3—3 of FIG. 2;

FIG. 4 is a cross-sectional view taken on line 4—4 of FIG. 2;

FIG. 5 is a cross-sectional view taken on line 5—5 of FIG. 2;

FIG. 6 is a side elevational view, partly broken away, of an alternative form of fishing rod holder embodying the present invention; and FIG. 7 is a cross-sectional view taken on line 7—7 of FIG. 6.

Referring in greater detail to the drawing wherein similar reference characters refer to similar parts, there is shown in FIGS. 1 to 5 a fishing rod holder, generally designated 10, comprising a cylindrical socket portion 12 from one end of which extends a support portion 14 and from the opposite end of which extends a ground insertable portion 16.

Both the support portion 14 and the insertable portion 16 are shaped as sections of a cylindrical shape common with the socket portion 12 and integrally connected with the socket portion 12 as at 18 and 20.

The support portion 14 encompasses about half the cylindrical plane to provide a ready access to a rod supported therein, while the insertable portion 16, although of approximately the same shape as the support portion adjacent the socket portion, tapers inwardly toward a point at 22.

At the outer end of support portion 14 there is provided a hole 24. This hole 24 is used for hanging up the holder on a peg or the like for storage purposes as well as during a metal-plating operation, if performed.

The socket portion 12, support portion 14 and insertable portion 16 are all integral and are preferably cut out from a single piece of tubing. The holder is preferably constructed of sheet metal which may, if desired, be plated with chrome, nickel or the like after it has been formed.

Adjacent the lower end of the socket portion 12 a relatively long finger 26 is struck out of the socket portion while at the opposite side, a relatively short finger 28 is struck out therefrom. The two fingers 26 and 28 are then bent in with the finger 28 below and supporting the finger 26 in a horizontal position (as best shown in FIG. 1).

The finger 26 is adapted to support the end 30 of a fishing rod 32 while, at the same time, it leaves enough space at either side of the finger to permit water, sand, dirt and the like to pass through and thereby be prevented from accumulating within the device.

With the above construction, the handle portion 34 of the rod 32 is easily inserted into the socket portion 12 until its end rests on finger 26. It is then released to rest on support portion 14. Of course, prior to this, the insertable portion 16 is inserted into the ground at an angle so that the support portion 14 is angularly positioned to support the rod handle 34 (as illustrated in FIG. 1). To remove the rod from the holder, it is merely necessary to grasp the handle 34 at the open portion of the support portion 14 and then lift the handle upwardly out of the holder.

In FIGS. 6 and 7 there is shown an alternative form of the invention wherein the holder, generally designated 50, is substantially similar to holder 10, including a similar socket portion 52, support portion 54 and insertable portion 56 integrally joined with each other. However, instead of having a finger arrangement, such as provided at 26 and 28 in the holder of FIG. 1, the holder 50 is provided with a pair of oppositely positioned holes at the socket portion 52; and through these holes extends a peg 58. This peg 58 is in substantially a common plane with the socket portion 52 at one end and is connected to the socket portion at that end by a weld 60. The opposite end of the peg extends through the corresponding hole in the socket portion for a substantial distance laterally of the holder. In this manner, the transversely-extending peg forms a support for the fishing rod within the confines of the socket portion 52 while its outer extremity forms an anvil or foot rest by means of which one may press with one's foot to force the portion 56 into the ground. It may also be struck with a hammer, rock or the like to provide inserting pressure or force thereon.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fishing rod holder comprising a completely cylindrical portion, a coaxial fishing rod hand socket support portion and a ground insertable portion, all of said portions being generally cylindrical and formed as portions of a cylindrical configuration coaxial and integral with said completely cylindrical portion, a pair of struck out fingers extending inwardly transversely from opposite sides of said completely cylindrical portion into parallel and mutually reinforcing positions providing a fishing rod handle stop in said completely cylindrical portion, said ground insertable portion tapering from a relatively wide end adjacent said completely cylindrical portion to a relatively narrow ground insertable point at the opposite end, said fishing rod handle socket support portion being substantially semi-cylindrical for the major portion of its length.

2. A fishing rod holder comprising a completely cylindrical portion, a coaxial fishing rod hand socket support portion and a ground insertable portion, all of said portions being generally cylindrical and formed as portions of a cylindrical configuration coaxial and integral with said completely cylindrical portion, a transverse peg extending through said completely cylindrical portion and projecting laterally therebeyond providing a foot receiving step for forcibly inserting said insertable portion into the ground, the transverse portion of said peg within said completely cylindrical portion providing a fishing rod handle stop in said completely cylindrical portion, said ground insertable portion tapering from a relatively wide end adjacent said completely cylindrical portion to a relatively narrow ground insertable point at the opposite end, said fishing rod handle socket support portion being substantially semi-cylindrical for the major portion of its length.

References Cited in the file of this patent

UNITED STATES PATENTS

| | | |
|---|---|---|
| 612,048 | Miller et al. | Oct. 11, 1898 |
| 1,131,508 | Hall | Mar. 9, 1915 |
| 1,339,833 | Saltmarsh et al. | May 11, 1920 |
| 2,322,600 | Stahler | June 22, 1943 |
| 2,652,999 | Lohmar | Sept. 22, 1953 |

FOREIGN PATENTS

| | | |
|---|---|---|
| 1,062,812 | France | Dec. 9, 1953 |

OTHER REFERENCES

Pruett Novelty Works, Nov. 21, 1931.